US012764377B2

(12) United States Patent
Wang et al.

(10) Patent No.: US 12,764,377 B2
(45) Date of Patent: Oct. 13, 2026

(54) VIDEO CONTROL METHOD AND APPARATUS, AND ELECTRONIC DEVICE AND STORAGE MEDIUM

(71) Applicants: DOUYIN VISION CO., LTD., Beijing (CN); Beijing Zitiao Network Technology Co., Ltd., Beijing (CN)

(72) Inventors: Chao Wang, Beijing (CN); Yang Li, Beijing (CN); Huihui Shang, Beijing (CN); Shengbin Meng, Beijing (CN); Qian Ma, Beijing (CN)

(73) Assignees: DOUYIN VISION CO., LTD., Beijing (CN); Beijing Zitiao Network Technology Co., Ltd., Beijing (CN)

( * ) Notice: Subject to any disclaimer, the term of this patent is extended or adjusted under 35 U.S.C. 154(b) by 84 days.

(21) Appl. No.: 18/996,184

(22) PCT Filed: Sep. 13, 2023

(86) PCT No.: PCT/CN2023/118480
§ 371 (c)(1),
(2) Date: Jan. 17, 2025

(87) PCT Pub. No.: WO2024/078245
PCT Pub. Date: Apr. 18, 2024

(65) Prior Publication Data

US 2026/0052290 A1 Feb. 19, 2026

(30) Foreign Application Priority Data

Oct. 9, 2022 (CN) ........................ 202211231559.6

(51) Int. Cl.
*H04N 21/435* (2011.01)
*H04N 21/462* (2011.01)
*H04N 21/84* (2011.01)

(52) U.S. Cl.
CPC ......... *H04N 21/435* (2013.01); *H04N 21/462* (2013.01); *H04N 21/84* (2013.01)

(58) Field of Classification Search
CPC ..... H04N 21/435; H04N 21/462; H04N 21/84
See application file for complete search history.

(56) References Cited

U.S. PATENT DOCUMENTS 10,997,423 B1 5/2021 Borras
2021/0144418 A1* 5/2021 Han .................. H04N 21/4532
2024/0097925 A1* 3/2024 Palamadai ............. H04N 7/152

FOREIGN PATENT DOCUMENTS

CN 101568027 A 10/2009
CN 111279709 A 6/2020
(Continued)

OTHER PUBLICATIONS

ISA China National Intellectual Property Administration, International Search Report Issued in Application No. PCT/CN2023/118480, Dec. 1, 2023, 8 pages.

*Primary Examiner* — Nicholas T Corbo
(74) *Attorney, Agent, or Firm* — Alleman Hall LLP

(57) ABSTRACT

A video control method and apparatus, an electronic device, and a storage medium are provided. The video control method includes: determining target forte attribute tag information that matches a target video, wherein the target forte attribute tag information is used for describing perception sensitivity degrees to definitions of an auditory part and a visual part in the target video; determining, according to the target forte attribute tag information, a target video level to be used in the target video; and performing downloading and/or playing control on the target video according to the target video level.

20 Claims, 4 Drawing Sheets

(56) References Cited

FOREIGN PATENT DOCUMENTS

| | | |
|---|---|---|
| CN | 114363704 A | 4/2022 |
| CN | 115604538 A | 1/2023 |

* cited by examiner

VIDEO CONTROL METHOD AND APPARATUS, AND ELECTRONIC DEVICE AND STORAGE MEDIUM

CROSS-REFERENCE TO RELATED APPLICATION(S)

This application is a U.S. National Stage Application of PCT Application Serial No. PCT/CN2023/118480, filed on Sep. 13, 2023, which claims priority to Chinese Patent Application No. 202211231559.6, filed with the China National Intellectual Property Administration on Oct. 9, 2022, the disclosures of which are incorporated herein by reference in their entirety.

FIELD

The present disclosure relates to the technical field of video processing, and for example, to a video control method and apparatus, an electronic device, and a storage medium.

BACKGROUND

Demands for downloading and playing videos are constantly increasing. In a process of online video playing, a player can provide a plurality of video levels (different video levels have different definitions) for downloading and playing. High-definition videos have higher video quality, but they also consume more network traffic. When the network signal is poor, there is a high risk of Internet lag, which can prevent normal video playing. Low-definition videos have low quality and can save network traffic. When the network signal is poor, the risk of Internet lag is lower. However, key content in the videos cannot be effectively displayed.

SUMMARY

The present disclosure provides a video control method and apparatus, an electronic device, and a storage medium.

In a first aspect, the present disclosure provides a video control method. The method includes:

- determining target forte attribute tag information that matches a target video, where the target forte attribute tag information is used for describing perception sensitivity degrees to definitions of an auditory part and a visual part in the target video;
- determining, according to the target forte attribute tag information, a target video level to be used in the target video; and
- performing, according to the target video level, downloading control and/or playing control on the target video.

In a second aspect, the present disclosure provides a video control method. The method includes:

- loading a target video level to be used in a target video, where the target video level is determined based on target forte tag attribute information, and the target forte tag attribute information matches the target video; the target forte tag attribute information is used for describing perception sensitivity degrees to definitions of an auditory part and a visual part in the target video; and
- initiating a target video resource request according to the target video level to perform downloading and/or playing on the target video with the target video level.

In a third aspect, the present disclosure provides a voice control apparatus. The apparatus includes:

- a target forte attribute tag information determining module, configured to determine target forte attribute tag information that matches a target video, where the target forte attribute tag information is used for describing perception sensitivity degrees to definitions of an auditory part and a visual part in the target video;
- a target video level determining module, configured to determine, according to the target forte attribute tag information, a target video level to be used in the target video; and
- a target video control module, configured to perform, according to the target video level, downloading control and/or playing control on the target video.
- a target video level loading module, configured to load a target video level to be used
- in a target video, where the target video level is determined based on target forte tag attribute information; the target forte tag attribute information matches the target video; the target forte tag attribute information is used for describing perception sensitivity degrees to definitions of an auditory part and a visual part in the target video; and
- a target video resource request initiation module, configured to initiate a target video resource request according to the target video level to perform downloading and/or playing on the target video with the target video level.

In a fifth aspect, the present disclosure further provides a video control electronic device. The electronic device includes:

- one or more processors; and
- a storage apparatus, configured to store one or more programs,
- where the one or more programs, when executed by the one or more processors, cause the one or more processors to implement the above-mentioned video control method.

In a sixth aspect, the present disclosure further provides a computer-readable storage medium, having a computer program stored thereon, where the program, when executed by a processor, implements the above-mentioned video control method.

In a seventh aspect, the present disclosure further provides a computer program product, including a computer program carried on a non-transitory computer-readable medium, where the computer program includes program codes used for implementing the video control method described above.

DETAILED DESCRIPTION OF EMBODIMENTS

Figure 1:
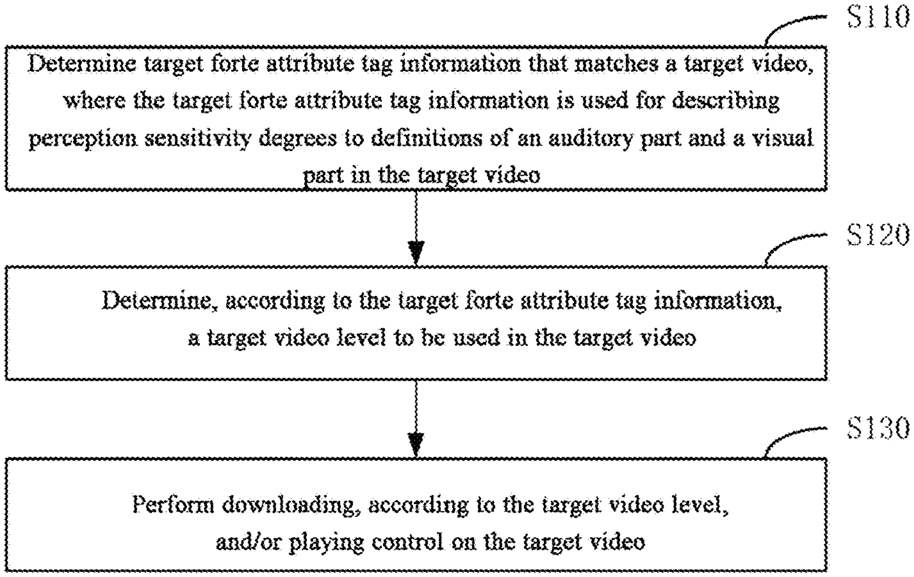
FIG. 1 is a flowchart of a video control method according to an embodiment of the present disclosure.

The embodiments of the present disclosure will be described below with reference to the accompanying drawings. Although the accompanying drawings show some embodiments of the present disclosure, the present disclosure can be implemented in various forms, and these embodiments are provided for understanding the present disclosure. The accompanying drawings and embodiments of the present disclosure are only used for illustration.

Multiple steps recorded in method implementations of the present disclosure can be executed in different orders and/or in parallel. In addition, the method implementations may include additional steps and/or omit the execution of the steps shown. The scope of the present disclosure is not limited in this aspect.

The term “include” and its variants as used herein mean open inclusion, namely, “including”. The term “based on” is “based at least in part on”. The term “one embodiment” means “at least one embodiment”. The term “another embodiment” means “at least another embodiment”. The term “some embodiments” means “at least some embodiments”. Relevant definitions of other terms will be given in the description below.

The concepts such as “first” and “second” mentioned in the present disclosure are only used to distinguish different apparatuses, modules, or units, and are not intended to limit the order or interdependence of the functions performed by these apparatuses, modules, or units.

The modifications of “one” and “plurality” mentioned in the present disclosure are indicative rather than restrictive, and those skilled in the art should understand that unless otherwise clearly stated in the context, they should be understood as “one or more”.

Messages or names of information interacted between a plurality of apparatuses in the implementations of the present disclosure are only for illustrative purposes and are not intended to limit the messages or the scope of the information.

Before the use of the technical solutions disclosed in the embodiments of the present disclosure, users should be informed of the type, scope of use, usage scenarios, and the like of personal information involved in the present disclosure in accordance with relevant laws and regulations in an appropriate manner, so as to obtain authorization from the users.

For example, in response to that an active request of a user has been received, prompt information is sent to the user to clearly remind the user that personal information of the user needs to be involved in an operation requested to be executed. Thus, the user can independently select whether to provide the personal information to software or hardware such as an electronic device, an application program, a server, or a storage medium that performs the operation of the technical solutions of the present disclosure according to the prompt information.

As an implementation, in response to an active request from a user that has been received, prompt information is sent to the user through, for example, a pop-up window where the prompt information can be presented in text. In addition, the pop-up window can also carry a selection control for the user to select whether to “agree” or “refuse” to provide the personal information to the electronic device.

The above notification and the above user authorization obtaining process are only illustrative and do not constitute a limitation on the implementations of the present disclosure. Other methods that meet the relevant laws and regulations can also be applied to the implementations of the present disclosure.

Data involved in the technical solutions (including the data itself, and obtaining or use of the data) should comply with the requirements of corresponding laws and regulations and relevant provisions.

FIG. 1 is a flowchart of a video control method according to an embodiment of the present disclosure. This embodiment of the present disclosure is applicable to a situation of adaptively controlling a video level. The method can be performed by a video control apparatus. The apparatus can be implemented in the form of software and/or hardware. For example, the apparatus is implemented through an electronic device. The electronic device can be a mobile terminal, a personal computer (PC) end, a server, or the like. As shown in FIG. 1, a video control method provided in this embodiment of the present disclosure may include the following steps.

S110: target forte attribute tag information that matches a target video is determined. The target forte attribute tag information is used for describing perception sensitivity degrees to definitions of an auditory part and a visual part in the target video.

The technical solution of the present disclosure can be executed by a server. The target video may be a video currently waiting to be operated. The target video may include an auditory part and a visual part. The auditory part may be used for indicating sound information generated by the target video. The visual part may be used for indicating picture information generated by the target video. A forte attribute may be a video attribute in which the auditory part has an advantage over the visual part in the video. A forte attribute tag may be a tag that marks a forte attribute. The target forte attribute tag information may be information associated with the forte attribute tag of the target video. For example, the target forte attribute tag information may be Strongest, Strong, Weak, or None. The target forte attribute tag information may be used for describing perception sensitivity degrees to definitions of the auditory part and the visual part in the target video. The definition of the auditory part may be a clarity level of sound generated by the target video. The definition of the visual part may be a clarity level of pictures generated by the target video. The perception sensitivity degree may be a sensitivity degree at which the auditory part and the visual part in the target video are perceived.

For a video with a forte attribute, such as a music video or a crosstalk video, the key content to be expressed by the video is concentrated in the auditory part. A user can understand the content of the video without paying attention to pictures of the video. The key content can be used to represent the primary information that the video intends to convey. In this case, a user has a higher perception sensitivity degree to the definition of the auditory part and a lower perception sensitivity degree to the definition of the visual part. Meanwhile, the definition of the visual part has a low impact on the user watching experience.

In this embodiment, the target forte attribute tag information that matches the target video needs to be determined first. Exemplarily, it is assumed that the forte attribute tag includes Strongest, Strong, Weak, or None. For a music video and a crosstalk video, they have obvious forte attributes, so the target forte attribute tag information of the music video and the crosstalk video can be determined as having the highest forte attribute level "Strongest". For a dance video and a film and television video, their forte attributes are weak, but still exist. Therefore, the target forte attribute tag information of the dance video and the film and television video can be determined as having a lower forte attribute level "Weak".

As an implementation, target forte attribute tag information that matches a target video is determined, which includes step A1 to step A2:

Step A1: a target auditory applicability of the target video is determined according to target audio track information of the target video. The target auditory applicability describes a degree of applicability for perceiving, using an auditory mode, key content expressed by the target video.

The target audio track information may be audio track information of the target video. For example, the target audio track information can include a tone, a tone library, a number of channels, an input/output port, a volume, and the like of an audio track. The target auditory applicability may be used for describing a degree of applicability for perceiving, using an auditory mode, key content expressed by the target video. For a target video with a forte attribute, its target auditory applicability is high, which means that the auditory mode is more suitable for being used for perceiving the key content expressed by the target video.

Exemplarily, video segments within adjacent time lengths can be selected from the target video, such as video segments within 0 to 1 s and 1 to 2 s. By comparison of audio track information corresponding to the two video segments, a content difference between the two video segments can be obtained, and the target auditory applicability of the target video can be determined according to the content difference. If there is a significant content difference between the two video segments, it indicates that the key content to be expressed in the target video lies in the visual part. In this case, it can be determined that the target video has a lower auditory applicability. If the content difference between two video segments is small, it indicates that the key content to be expressed in the target video lies in the auditory part. In this case, it can be determined that the target video has a high auditory applicability.

Step A2: the target forte attribute tag information that matches the target video is determined according to the target auditory applicability and target content classification. The target content classification describes a performing form used for presenting the content expressed by the target video.

The target content may be the content expressed in the target video. The target content classification can be used for describing the performing form used for presenting the content expressed in the target video. The performing form may include music, dance, skits, crosstalk, documentary films, or the like. Exemplarily, the target content classification may include a music video, a square dance video, a skit video, a crosstalk videos, a travel video, a food video, or the like. In this embodiment, the target forte attribute tag information that matches the target video can be determined based on the target auditory applicability and the target content classification. Exemplarily, refer to Table 1:

TABLE 1

Target forte attribute tag information that matches the target video

| Target auditory applicability | Target content classification | Target forte attribute tag information |
|---|---|---|
| High | Music video, crosstalk video | Strongest |
| High | Financial video, skit video, entertainment video, health video, workplace video, emotional video, workplace video, funny video, real estate video, cultural video | Strong |
| High | Life video, film video, animation video, science and technology video, travel video, variety show video, game video, sports video, food video, animal video, fashion video, car video, fitness video, dance video, life record video, and square dance video | Weak |
| Low | All remaining classifications | None |

The target content classification and the target forte attribute tag information in Table 1 are only examples and can be flexibly adjusted according to an actual application need.

By use of the above method, the target forte attribute tag information that matches the target video is determined based on two dimensions: the target auditory applicability and the target content classification, which improves the accuracy of the target forte attribute tag information.

As an implementation, a target auditory applicability of the target video is determined according to target audio track information of the target video, which includes step B1 to step B2:

Step B1: whether the target video satisfies a preset determining standard condition is determined according to the target audio track information. The preset determining standard condition includes a first standard condition, a second standard condition, and/or a third standard condition; the first standard condition includes the visual part in the video remaining stationary; the second standard condition includes a ratio of the key content in the video to the visual part in the video being less than a preset value and the key content in the video being able to be obtained by parsing without perceiving the visual part in the video; and the third standard condition includes the auditory part in the video containing an explanation of the visual part in the video.

The preset determining standard condition may be a target video determining condition preset in advance. The preset determining standard condition may include the first standard condition, the second standard condition, and/or the third standard condition. The first standard condition may include the visual part in the video remaining stationary. The second standard condition may include the ratio of the key content in the video to the visual part in the video being less than the preset value and the key content in the video being able to be obtained by parsing without perceiving the visual part in the video. The preset value may be a preset ratio value of the visual part in the video. The third standard condition may include the auditory part in the video containing the explanation of the visual part in the video.

Exemplarily, when a picture of the target video only remains stationary as a background, it can be determined that the target video satisfies the preset determining standard condition of the visual part of the video remaining stationary. Assuming that the target video is a music video, when only lyrics jump and change in the video and the background picture remains unchanged, it can be determined that the target video satisfies the preset determining standard condition of the ratio of the key content in the video to the visual part in the video being less than the preset value and the key content in the video being able to be obtained by parsing without perceiving the visual part in the video. If the target video is a broadcast or explanation type video, it can be determined that the target video satisfies the preset determining standard condition of the auditory part in the video containing an explanation of the visual part in the video.

In this embodiment, the target text information of the target video can be determined. The target text information includes the description content of the target video edited by a video creator when the video creator posts the target video. At this time, the target audio track information and the target text information can be input to a pre-trained audio track and text determining model to determine, through the model, whether the target video satisfies the preset determining standard condition. The audio track and text determining model may be a machine learning model trained by a supervised model according to audio track information, text information, and a preset determining standard condition of historical videos, which can be used for determining whether the target video satisfies the preset determining standard condition. Since the target audio track information and the target text information are input to the pre-trained audio track and text determining model, whether the target video satisfies the preset determining standard condition can be quickly and accurately determined according to an output result of the audio track and text determining model.

Step B2: the target auditory applicability of the target video is determined according to a result of satisfaction of the target video on the preset determining standard condition. The target auditory applicability is in positive correlation with a tendency to use the auditory mode to perceive the target video.

In this embodiment, the target auditory applicability of the target video can be determined according to the result of satisfaction of the target video on the preset determining standard condition. If the target video satisfies the preset determining standard condition, it indicates that the target auditory applicability of the target video is high. If the target video does not satisfy the preset determining standard condition, it indicates that the target auditory applicability of the target video is low. The target auditory applicability is in positive correlation with the tendency to use the auditory mode to perceive the target video. Namely, if the target auditory applicability is higher, the tendency to use the auditory mode to perceive the target video is larger; and if the target auditory applicability is lower, the tendency to use the auditory mode to perceive the target video is smaller. The tendency is a degree of tendency.

By use of the above method, the target auditory applicability of the target video can be quickly and accurately determined through the preset determining standard condition.

S120: a target video level to be used in the target video is determined according to the target forte attribute tag information.

The target video level may be a definition level of the target video. If the target video level is lower, the definition of the target video is lower. For example, the target video level may be 360p, 480p, 720p, or 1080p. 360p corresponds to the lowest definition of the target video, and 1080p corresponds to the highest definition of the target video. In addition, videos with stronger forte attributes have higher perception sensitivity degrees to the definition of the auditory part and require lower video levels, indicating that the strength of the forte attribute is in negative relationship with the video level.

In this embodiment, the target video level to be used for the target video can be determined according to the target forte attribute tag information. Exemplarily, video levels that can be supported by the target video can be divided into different grades, and a corresponding supportable video level is selected as the target video level according to the target forte attribute tag information. For example, assuming that the video levels that can be supported by the target video include 360p, 480p, 720p, and 1080p, and the forte attribute tag information includes Strongest, Strong, Weak, and None. The video levels that can be supported by the target video can be first divided into four grades according to video definitions from low to high, namely, higher video levels correspond to higher video definitions. Final division results are as follows: The first grade is 360p; the second grade is 480p; the third grade is 720p; and the fourth grade is 1080p.

If the target forte attribute tag information is None, it indicates that a very high requirement is put forward to the video definition, and the fourth grade of 1080p can be determined as the target video level. If the target forte attribute tag information is Weak, it indicates that a high requirement is put forward to the video definition, and the third grade of 720p can be determined as the target video level. If the target forte attribute tag information is Strong, it indicates that a low requirement is put forward to the video definition, and the second grade of 480p can be determined as the target video level. If the target forte attribute tag information is Strongest, it indicates that a very low requirement is put forward to the video definition, and the first grade of 360p can be determined as the target video level. In addition, the target video level may alternatively be determined in combination with hardware performance of a video playing device. If the target forte attribute tag information is Strong, for a video playing device with high hardware performance (high-end device), the video definition can be appropriately improved, namely, the third level of 720p is determined as the target video level; and for a video playing device with low hardware performance (low-end device), the second level of 480p can still be maintained as the target video level. An example of determining the target video level according to the target forte attribute tag information and the hardware performance of the video playing device can be found in Table 2:

TABLE 2

| Target video levels under different device configurations | | |
|---|---|---|
| Target forte attribute tag | Target video level of low-end device | Target video level of high-end device |
| Strongest | First grade | First grade |
| Strong | Second grade | Third grade |
| Weak | Third grade | Third grade |
| None | Fourth grade | Fourth grade |

S130: downloading and/or playing control is performed on the target video according to the target video level.

In this embodiment, after the target video level is determined, the target video level can be used to perform the downloading and/or playing control on the target video.

According to the technical solution of this embodiment of the present disclosure, target forte attribute tag information that matches a target video is determined, where the target forte attribute tag information is used for describing perception sensitivity degrees to definitions of an auditory part and a visual part in the target video; a target video level to be used in the target video is determined according to the target forte attribute tag information; and downloading and/or playing control is performed on the target video according to the target video level. By use of the technical solution of this embodiment of the present disclosure, the target forte attribute tag information is introduced to determine the target video level of the target video, so as to control the target video according to the target video level, which can reduce the lag of playing and improve the playing fluency, without affecting the watching experience.

Figure 2:
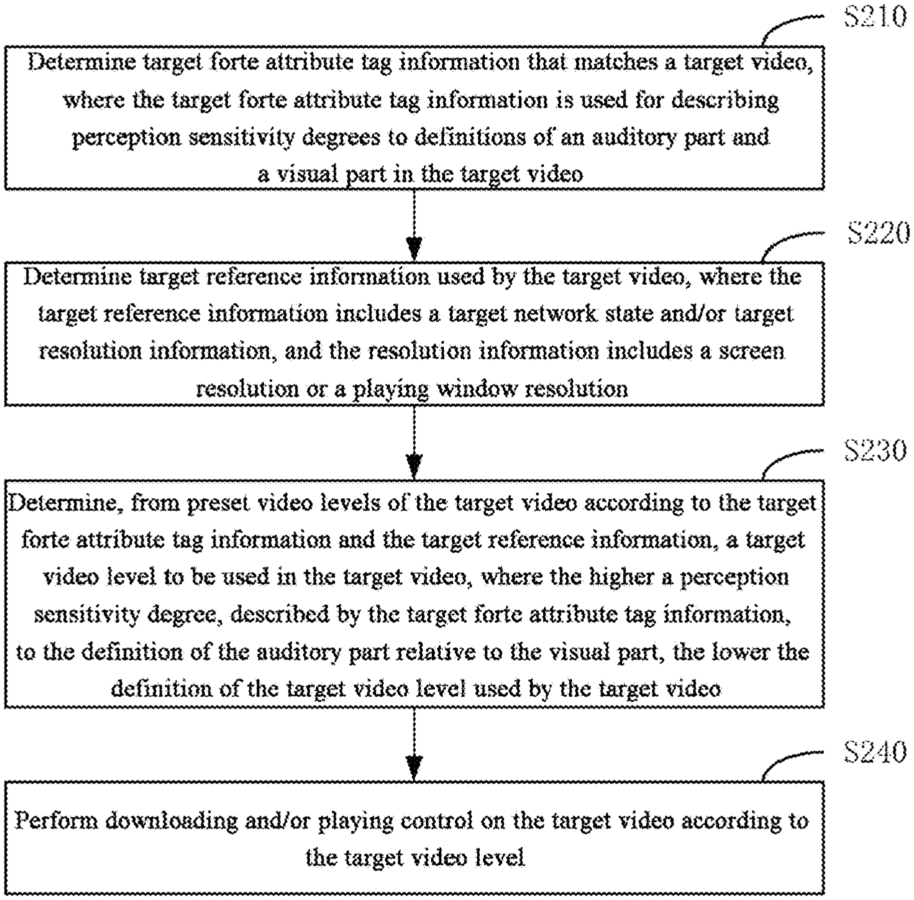
FIG. 2 is a flowchart of another video control method according to an embodiment of the present disclosure.

FIG. 2 is a flowchart of another video control method according to an embodiment of the present disclosure. This embodiment of the present disclosure will explain the foregoing embodiment based on the above embodiment. This embodiment of the present disclosure can be combined with the solutions in the one or more embodiments. As shown in FIG. 2, a video control method provided in this embodiment of the present disclosure may include the following steps.

S210: target forte attribute tag information that matches a target video is determined. The target forte attribute tag information is used for describing perception sensitivity degrees to definitions of an auditory part and a visual part in the target video.

S220: target reference information used by the target video is determined. The target reference information includes a target network state and/or target resolution information. The resolution information includes a screen resolution or a playing window resolution.

The target reference information may be state parameter information corresponding to the target video. The target reference information may include the target network state and/or the target resolution information. The target network state may be a network state used during the downloading and/or playing of the target video. Exemplarily, the target network state may include a network speed of the target video. The target resolution information can be used for representing a screen resolution supported by a target video playing device The resolution information can include a screen resolution or a resolution of a playing window on a screen. There may be one or more target resolutions. For example, the target video playing device can simultaneously support three screen resolutions: a, b, and c.

S230: a target video level to be used in the target video is determined from preset video levels of the target video according to the target forte attribute tag information and the target reference information. If the perception sensitivity degree, described by the target forte attribute tag information, to the definition of the auditory part relative to the visual part is higher, the target video uses the target video level with a lower definition.

The preset video levels may be preset video levels that can be supported by the target video. The higher the perception sensitivity degree, described by the target forte attribute tag information, to a definition of the auditory part relative to the visual part, the lower the definition of the target video level used by the target video.

In this embodiment, three different methods can be selected to determine the target video level to be used in the target video. The first method is to determine the target video level according to the target forte attribute tag information and the target network state. The second method is to determine the target video level according to the target forte attribute tag information and the target resolution information. The third method is to determine the target video level according to the target forte attribute tag information, the target network state, and the target resolution information. Exemplarily, the third method is taken as an example. The highest video level that satisfies the target network state and the target screen resolution can be selected from the preset video levels of the target video. Then, for all preset video levels that are lower than or equal to the highest video level, the target video level can be determined according to the target forte attribute tag information.

As an implementation, the target video level to be used in the target video is determined from the preset video levels of the target video according to the target forte attribute tag information, the target network state, and the target screen resolution, which includes step C1 to step C3.

Step C1: a first video level upper limit currently applicable to the target video is determined from the preset video levels of the target video according to the target network state.

The first video level upper limit may be a video level upper limit supported by the target network state. In this embodiment, the first video level upper limit currently applicable to the target video can be determined from the preset video levels of the target video according to the target network state. If the target video level exceeds the first video level upper limit, the target network state cannot provide support for the target video level, and there will be a risk of video picture lag at this time.

Step C2: a second video level upper limit currently applicable to the target video is determined from preset video levels corresponding to the first video level upper limit according to the target screen resolution.

The second video level upper limit may be a video level upper limit supported by the target screen resolution. In this embodiment, the second video level upper limit currently applicable to the target video may be determined from preset video levels corresponding to the first video level upper limit according to the target screen resolution. If the target video level exceeds the second video level upper limit, the target screen resolution cannot provide support for the target video. In this case, the video picture quality cannot be improved.

Step C3: the target video level currently to be used in the target video is determined from preset video levels corresponding to the first video level upper limit according to the target screen resolution.

In this embodiment, the target video level currently to be used in the target video can be then determined from the preset video levels corresponding to the second video level upper limit according to the target forte attribute tag information. Exemplarily, it is assumed that the preset video levels include 360p, 480p, 720p, and 1080p. The first video level upper limit determined according to the target network state is 1080p (i.e. the target video level cannot exceed 1080p), and the second video level upper limit determined according to the target screen resolution is 720p (i.e. the target video level cannot exceed 720p). Meanwhile, the forte attribute tag includes Strongest, Strong, Weak, or None.

If the target forte attribute tag information is None, the target video level can be determined as the second video level upper limit of 720p. If the target forte attribute tag information is Strongest, the target video level can be determined as the lowest video level of 360p among the preset video levels. If the target forte attribute tag information is Strong, the target video level can be determined as 480p or 720p in combination with the hardware performance of the target playing device. If the target forte attribute tag information is Weak, the target video level can be determined as the lowest video level of 360p among the preset video levels.

By use of the above mode, the target video level to be used in the target video can be determined by comprehensive considering three dimensions: the preset video levels of the target video according to the target forte attribute tag information, the target network state, and the target screen resolution, thereby improving the accuracy and applicability of the target video level.

S240: downloading and/or playing control is performed on the target video according to the target video level.

As an implementation, downloading and/or playing control is performed on the target video according to the target video level, which includes step D1 to step S2.

Step D1: the target video level is sent to a target client to cause the target client to initiate a target video resource request according to the target video level.

The target client may be a client with a video downloading and/or playing requirement. The target video resource request may be an operation instruction for requesting target video resources from the server. The target video resource request carries the target video level. In this embodiment, after the server determines the target video level, the target video level can be sent to the target client, so that the target client can initiate the target video resource request according to the target video level.

Step D2: in response to the target video resource request, the target video with the target video level is sent to the target client for downloading and/or playing.

In this embodiment, after receiving the target video resource request sent by the target client, the server can send the target video with the target video level to the target client for downloading and/or playing.

By use of the above method, the server can directly send the target video with the target video level according to the target video resource request sent by the target client.

In the technical solution of this embodiment of the present disclosure, a target network state and a target screen resolution used for a target video are determined; a target video level to be used in the target video is determined from preset video levels of the target video according to target forte attribute tag information, the target network state, and the target screen resolution. The higher the perception sensitivity degree, described by the target forte attribute tag information, to a definition of the auditory part relative to the visual part, the lower the definition of the target video level used by the target video. By use of the technical solutions of this embodiment of the present disclosure, the target forte attribute tag information is introduced to determine the target video level of the target video, so as to control the target video according to the target video level, which can reduce lag of playing and improve the playing fluency, without affecting the watching experience. By comprehensively considering three dimensions: the target forte attribute tag information, the target network state, and the target screen resolution, the target video level to be used in the target video is determined from the preset video levels of the target video, thereby improving the accuracy and applicability of the target video level.

Figure 3:
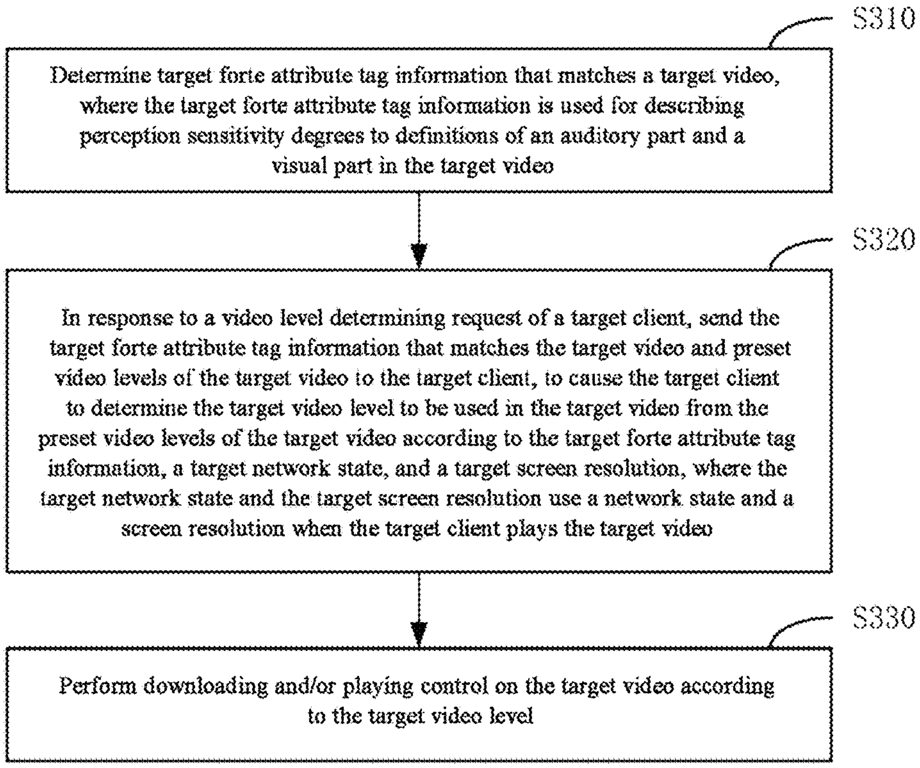
FIG. 3 is a flowchart of still another video control method according to an embodiment of the present disclosure.

FIG. 3 is a flowchart of still another video control method according to an embodiment of the present disclosure. This embodiment of the present disclosure will explain the foregoing embodiment based on the above embodiment. This embodiment of the present disclosure can be combined with the solutions in the one or more embodiments. As shown in FIG. 3, a video control method provided in this embodiment of the present disclosure may include the following steps.

S310: target forte attribute tag information that matches a target video is determined. The target forte attribute tag information is used for describing perception sensitivity degrees to definitions of an auditory part and a visual part in the target video.

S320. In response to a video level determining request of a target client, the target forte attribute tag information that matches the target video and preset video levels of the target video are sent to the target client, to cause the target client to determine, the target video level to be used in the target video from the preset video levels of the target video according to the target forte attribute tag information, a target network state, and a target screen resolution. The target network state and the target screen resolution use a network state and a screen resolution when the target client plays the target video.

The video level determining request may be an operation instruction for requesting a server to determine the target video level. In this embodiment, after receiving the video level determining request of the target client, the server can send the target forte attribute tag information that matches the target video and the preset video levels of the target video, to cause the target client to determine the target video level to be used in the target video from the preset video levels of the target video according to the target forte attribute tag information, the target network state, and the target screen resolution. The target network state and the target screen resolution use a network state and a screen resolution when the target client plays the target video.

S330. Downloading and/or playing control is performed on the target video according to the target video level.

As an implementation, downloading and/or playing control is performed on the target video according to the target video level, which may further include the following processes:

in response to a target video resource request initiated by the target client, sending the target video with the target video level to the target client for downloading and/or playing. The target video resource request is initiated by the target client based on the target video level to be used in the target video determined by the target client.

In this embodiment, after receiving the target video resource request initiated by the target client, the server can send the target video with the target video level to the target client for downloading and/or playing. The target video level is determined by the target client according to the target video determined by the target client. The target video resource request is initiated by the target client based on the target video level to be used in the target video determined by the target client.

By use of the above method, the target video level can be determined by the target client, and the target video can be downloaded and/or played according to the target video level.

Figure 4:
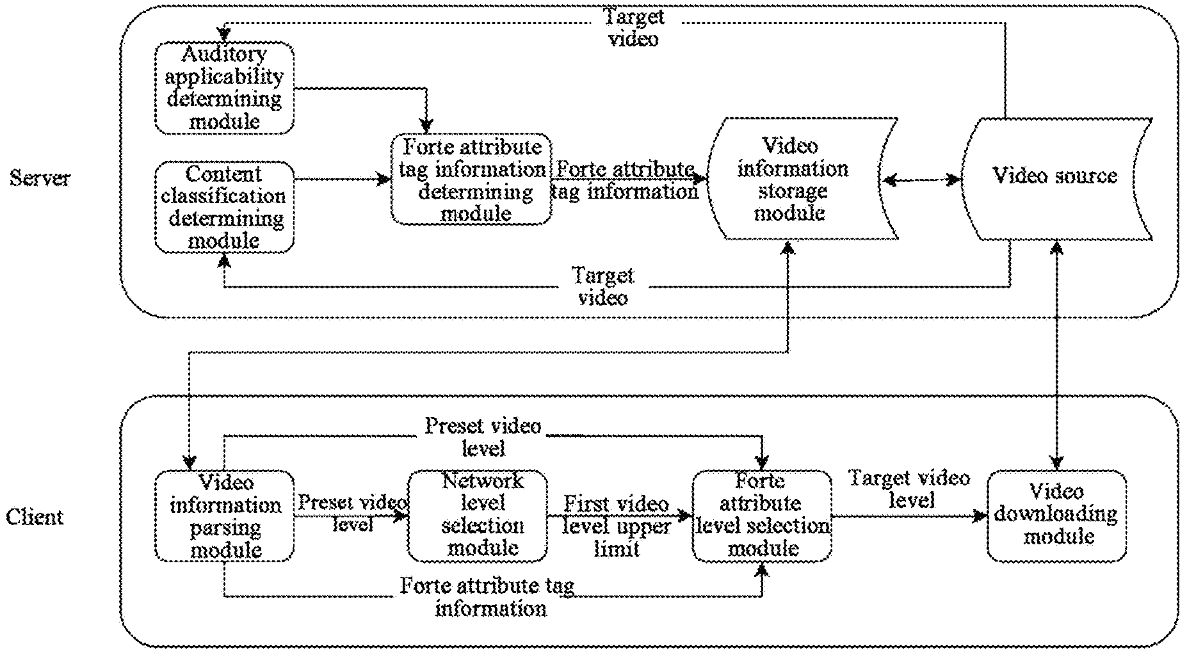
FIG. 4 is a schematic structural diagram of a video control system according to an embodiment of the present disclosure.

Referring to FIG. 4, the video control system includes a server and a client. The server includes an auditory applicability determining module, a content classification determining module, a forte attribute tag information determining module, a video information storage module, and a video source. The video source can provide a target video to the target client. The auditory applicability determining module can be configured to determine a target auditory applicability of the target video. The content classification determining module can be configured to determine a target content classification of the target video. The forte attribute tag information determining module can be configured to determine the target forte attribute tag information of the target video. The video information storage module can be configured to store preset video levels of the target video and target forte attribute tag information. The client can include a video information parsing module, a network level selection module, a forte attribute level selection module, and a video downloading module. The video information parsing module can be configured to parsing the video information from the server to obtain the preset video levels of the target video and the target forte attribute tag information. The network level selection module can be configured to determine a first video level upper limit according to a target network state. The forte attribute level selection module can be configured to determine the target video level according to the target forte attribute tag information. The video download module can be configured to download the target video.

In the technical solution of this embodiment of the present disclosure, in response to a video level determining request of a target client, target forte attribute tag information that matches a target video and preset video levels of the target video are sent to the target client, to cause the target client to determine the target video level to be used in the target video from the preset video levels of the target video according to the target forte attribute tag information, the target network state, and the target screen resolution. The target network state and the target screen resolution use a network state and a screen resolution when the target client plays the target video. By use of the technical solutions of this embodiment of the present disclosure, the target forte attribute tag information is introduced to determine the target video level of the target video, so as to control the target video according to the target video level, which can reduce lag of playing and improving the playing fluency, without affecting the watching experience. By comprehensively considering the three dimensions: the target forte attribute tag information, the target network state, and the target screen resolution, the target video level to be used in the target video is determined from the preset video levels of the target video, thereby improving the accuracy and applicability of the target video level.

Figure 5:
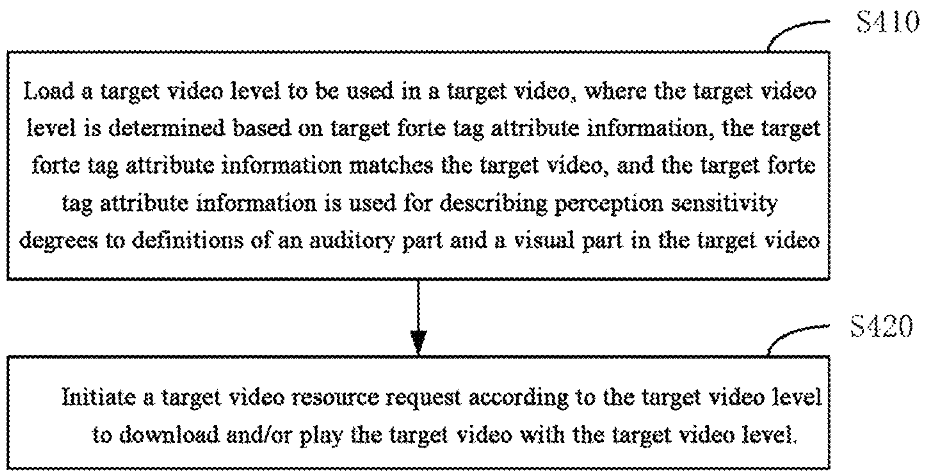
FIG. 5 is a flowchart of still another video control method according to an embodiment of the present disclosure.

FIG. 5 is a flowchart of another video control method according to an embodiment of the present disclosure. This embodiment of the present disclosure is applicable to a situation of adaptively controlling a video level. The method can be performed by a video control apparatus. The apparatus can be implemented in the form of software and/or hardware. For example, the apparatus is implemented through an electronic device. The electronic device can be a mobile terminal, a PC end, a server, or the like. As shown in FIG. 5, a video control method provided in this embodiment of the present disclosure may include the following steps.

S410: a target video level to be used in a target video is loaded, where the target video level is determined based on target forte tag attribute information, the target forte tag attribute information matches the target video, and the target forte tag attribute information is used for describing perception sensitivity degrees to definitions of an auditory part and a visual part in the target video.

The technical solution of the present disclosure can be executed by a client. In this embodiment, the target video level to be used in the target video is first loaded. The target video level is determined based on the target forte tag attribute information. The target forte tag attribute information matches the target video. The target forte tag attribute information is used for describing perception sensitivity degrees to the definitions of the auditory part and the visual part in the target video.

S420. A target video resource request is initiated according to the target video level to download and/or play the target video with the target video level.

In this embodiment, after the target video level is loaded, the target video resource request can be initiated according to the target video level, so that the target video with the target video level is downloaded and/or played according to the describing perception sensitivity degrees to definitions of an auditory part and a visual part in the target video.

In the technical solution of this embodiment of the present disclosure, a target video level to be used in a target video is loaded, where the target video level is determined based on target forte tag attribute information; the target forte tag attribute information matches the target video; the target forte tag attribute information is used for describing perception sensitivity degrees to definitions of an auditory part and a visual part in the target video; and a target video resource request is initiated according to the target video level to download and/or play the target video with the target video level. By use of the technical solution of this embodiment of the present disclosure, the target forte attribute tag information is introduced to determine the target video level of the target video, so as to control the target video according to the target video level, which can reduce lag of playing and improve the playing fluency, without affecting the watching experience.

Figure 6:
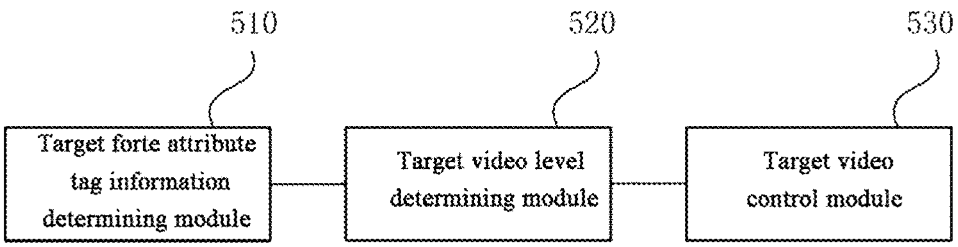
FIG. 6 is a schematic structural diagram of a video control apparatus according to an embodiment of the present disclosure.

FIG. 6 is a schematic structural diagram of a video control apparatus according to an embodiment of the present disclosure. This embodiment of the present disclosure is applicable to a situation of adaptively controlling a video level. The apparatus can be implemented in the form of software and/or hardware and is generally integrated on any electronic device with a network communication function. The electronic device can be a mobile terminal, a PC end, a server, or the like. As shown in FIG. 6, the apparatus includes: a target forte attribute tag information determining module 510, a target video level determining module 520, and a target video control module 530.

The target forte attribute tag information determining module 510 is configured to determine target forte attribute tag information that matches a target video, where the target forte attribute tag information is used for describing perception sensitivity degrees to definitions of an auditory part and a visual part in the target video; the target video level determining module 520 is configured to determine, according to the target forte attribute tag information, a target video level to be used in the target video; and the target video control module 530 is configured to perform downloading control and/or playing control on the target video according to the target video level.

In a solution of this embodiment of the present disclosure, the target forte attribute tag information determining module 510 includes:

a target auditory applicability determining unit, configured to: determine a target auditory applicability of the target video according to target audio track information of the target video, where the target auditory applicability describes a degree of applicability for perceiving, using an auditory mode, key content expressed by the target video; and a target forte attribute tag information determining unit, configured to: determine, according to the target auditory applicability and target content classification, the target forte attribute tag information that matches the target video, where the target content classification describes a performing form used for presenting content expressed by the target video.

In a solution of this embodiment of the present disclosure, the target auditory applicability determining unit is configured to:

determine, according to the target audio track information, whether the target video satisfies a preset determining standard condition, where the preset determining standard condition includes a first standard condition, a second standard condition, and/or a third standard condition; the first standard condition includes the visual part in the video remaining stationary; the second standard condition includes a ratio of the key content in the video to the visual part in the video being less than a preset value and the key content in the video being able to be obtained by parsing without perceiving the visual part in the video; the third standard condition includes the auditory part in the video containing an explanation of the visual part in the video; and determine the target auditory applicability of the target video according to a result of satisfaction of the target video on the preset determining standard condition, where the target auditory applicability is in positive correlation with a tendency to use the auditory mode to perceive the target video.

In a solution of this embodiment of the present disclosure, the target video level determining module 520 is configured to:

determine target reference information used by the target video, where the target reference information includes a target network state and/or target resolution information, and the resolution information includes a screen resolution or a playing window resolution; and determine, from preset video levels of the target video according to the target forte attribute tag information and the target reference information, the target video level to be used in the target video, where the higher a perception sensitivity degree, described by the target forte attribute tag information, to a definition of the auditory part relative to the visual part, the lower the definition of the target video level used by the target video.

In a solution of this embodiment of the present disclosure, the target video control module 530 is configured to:

send the target video level to a target client to cause the target client to initiate a target video resource request according to the target video level; and in response to the target video resource request, send the target video with the target video level to the target client for downloading and/or playing.

In a solution of this embodiment of the present disclosure, the target video level determining module 520 is further configured to:

in response to a video level determining request of a target client, send the target forte attribute tag information that matches the target video and preset video levels of the target video to the target client, to cause the target client to determine the target video level to be used in the target video from the preset video levels of the target video according to the target forte attribute tag information, a target network state, and a target screen resolution, where the target network state and the target screen resolution use a network state and a screen resolution when the target client plays the target video.

In a solution of this embodiment of the present disclosure, the target video control module 530 is further configured to:

in response to a target video resource request initiated by the target client, send the target video with the target video level to the target client for downloading and/or playing; and the target video resource request is initiated by the target client based on the target video level to be used in the target video determined by the target client.

In a solution of this embodiment of the present disclosure, determining the target video level to be used in the target video from the preset video levels of the target video according to the target forte attribute tag information, the target network state, and the target screen resolution includes:

determining, from the preset video levels of the target video according to the target network state, a first video level upper limit currently applicable to the target video; determining, from preset video levels corresponding to the first video level upper limit according to the target screen resolution, a second video level upper limit currently applicable to the target video; and determining, from preset video levels corresponding to the second video level upper limit according to the target forte attribute tag information, the target video level currently to be used in the target video.

The video control apparatus provided in this embodiment of the present disclosure can implement the video control method provided in the first three embodiments of the present disclosure, and includes corresponding functional modules for implementing the method and corresponding effects.

Figure 7:
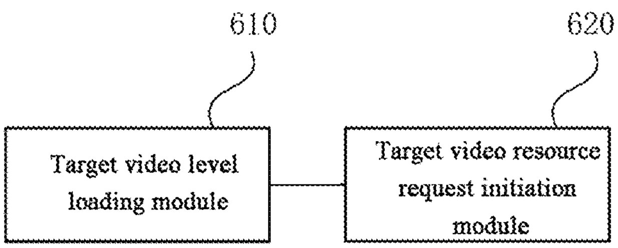
FIG. 7 is a schematic structural diagram of another video control apparatus according to an embodiment of the present disclosure.

FIG. 7 is a schematic structural diagram of another video control apparatus according to an embodiment of the present disclosure. This embodiment of the present disclosure is applicable to a situation of adaptively controlling a video level. The apparatus can be implemented in the form of software and/or hardware and is generally integrated on any electronic device with a network communication function. The electronic device can be a mobile terminal, a PC end, a server, or the like. As shown in FIG. 7, the apparatus includes: a target video level loading module 610 and a target video resource request initiation module 620.

The target video level loading module 610 is configured to load a target video level to be used in a target video, where the target video level is determined based on target forte tag attribute information, the target forte tag attribute information matches the target video, and the target forte tag attribute information is used for describing perception sensitivity degrees to definitions of an auditory part and a visual part in the target video; and the target video resource request initiation module 620 is configured to initiate a target video resource request according to the target video level to perform downloading and/or playing on the target video with the target video level.

The video control apparatus provided in this embodiment of the present disclosure can implement the video control method provided in the fourth embodiment of the present disclosure, and includes corresponding functional modules for implementing the method and corresponding effects.

The multiple units and modules included in the above apparatus are only divided according to a functional logic, but are not limited to the above division, as long as the corresponding functions can be achieved. In addition, the names of the multiple functional units are only for the purpose of distinguishing and are not used to limit the protection scope of the embodiments of the present disclosure.

Figure 8:
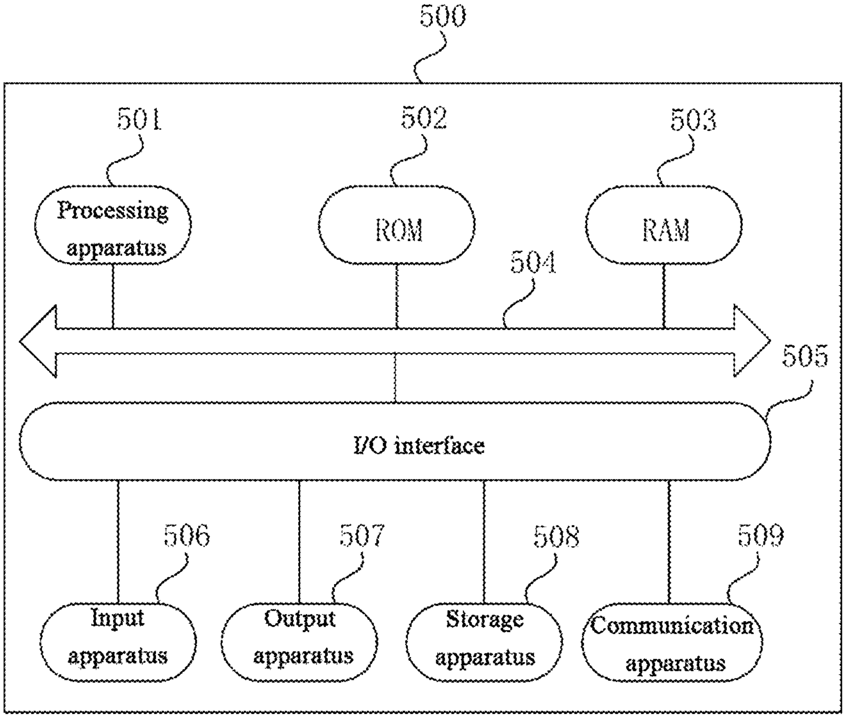
FIG. 8 is a schematic structural diagram of a video control electronic device according to an embodiment of the present disclosure.

FIG. 8 is a schematic structural diagram of a video control electronic device according to an embodiment of the present disclosure. Reference is now made to FIG. 8 below, which illustrates a schematic structural diagram of an electronic device (for example, a terminal device or a server in FIG. 8) 500 suitable for implementing an embodiment of the present disclosure. The terminal device in this embodiment of the present disclosure may include a mobile terminal such as a mobile phone, a laptop, a digital broadcast receiver, a Personal Digital Assistant (PDA), a PAD, a Portable Media Player (PMP), an in-vehicle terminal (such as an in-vehicle navigation terminal), and a fixed terminal such as digital television (TV) and a desktop computer. The electronic device 500 shown in FIG. 8 is only an example and should not impose any limitations on the functionality and scope of use of the embodiments of the present disclosure.

As shown in FIG. 8, the electronic device 500 may include a processing apparatus (such as a central processing unit and graphics processor) 501 that can perform various appropriate actions and processing according to programs stored in a Read-Only Memory (ROM) 502 or loaded from a storage apparatus 508 to a Random Access Memory (RAM) 503. Various programs and data required for operations of the electronic device 500 may also be stored in the RAM 503. The processing apparatus 501, the ROM 502, and the RAM 503 are connected to each other through a bus 504. An Input/Output (I/O) interface 505 is connected to the bus 504 too.

Usually, following apparatuses can be connected to the I/O interface 505: an input apparatus 506 including a touch screen, a touchpad, a keyboard, a mouse, a camera, a microphone, an accelerometer, a gyroscope, and the like; an output apparatus 507 including a Liquid Crystal Display (LCD), a speaker, a vibrator, and the like; a memory 508 including a magnetic tape, a hard disk, and the like; and a communication apparatus 509. The communication apparatus 509 can allow the electronic device 500 to wirelessly or wiredly communicate with other devices to exchange data. Although FIG. 8 shows the electronic device 500 with various apparatuses, the electronic device 500 is not required to implement or have all the apparatuses shown, and can alternatively implement or have more or fewer apparatuses.

According to the embodiments of the present disclosure, the process described in the reference flowchart above can be implemented as a computer software program. For example, the embodiments of the present disclosure include a computer program product, including a computer program carried on a non-transitory computer-readable medium, and the computer program includes program codes used for performing the methods shown in the flowcharts. In such an embodiment, the computer program may be downloaded and installed from a network through the communication apparatus 509, or installed from the memory 508, or installed from the ROM 502. When the computer program is executed by the processing apparatus 501, the above-mentioned functions defined in the methods of the embodiments of the present disclosure are executed.

Messages or names of information interacted between a plurality of apparatuses in the implementations of the present disclosure are only for illustrative purposes and are not intended to limit the messages or the scope of the information.

The electronic device provided in this embodiment of the present disclosure and the video control method provided in the above embodiment belong to the same concept. Technical details not fully described in this embodiment can be found in the above embodiment, and this embodiment has the same effects as the above embodiment.

The embodiments of the present disclosure provide a computer storage medium having a computer program stored thereon. Execution of the program by a processor implements the video control method provided in the above embodiment.

The computer-readable medium mentioned in the present disclosure can be a computer-readable signal medium, a computer-readable storage medium, or any combination of the computer-readable signal medium and the computer-readable storage medium. The computer-readable storage medium can be, for example, electric, magnetic, optical, electromagnetic, infrared, or semiconductor systems, apparatuses, or devices, or any combination of the above. Examples of the computer-readable storage medium may include: an electrical connection with one or more wires, a portable computer disk, a hard disk, a RAM, a ROM, an Erasable Programmable Read Only Memory (EPROM or flash memory), an optical fiber, a Compact Disc Read-Only Memory (CD-ROM), an optical storage device, a magnetic storage device, or any suitable combination of the above components. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including: a wire, an optical cable, a Radio Frequency (RF), and the like, or any suitable combination of the above.

In some implementations, clients and servers can communicate using any currently known or future developed network protocol such as a HyperText Transfer Protocol (HTTP), and can intercommunicate and be interconnected with digital data in any form or medium (for example, a communication network). Examples of the communication network include a Local Area Network (LAN), a Wide Area Network (WAN), an internet (such as an Internet), a point-to-point network (such as an ad hoc point-to-point network, and any currently known or future developed network.

The computer-readable medium may be included in the electronic device or exist alone and is not assembled into the electronic device.

The above computer-readable medium carries one or more programs. The above one or more programs, when executed by the electronic device, causes the electronic device to: determine target forte attribute tag information that matches a target video, where the target forte attribute tag information is used for describing perception sensitivity degrees to definitions of an auditory part and a visual part in the target video; determine, according to the target forte attribute tag information, a target video level to be used in the target video; and perform at least one of downloading control and playing control on the target video according to the target video level.

The above computer-readable medium carries one or more programs. The above one or more programs, when executed by the electronic device, cause the electronic device to: load a target video level to be used in a target video, where the target video level is determined based on target forte tag attribute information, the target forte tag attribute information matches the target video, and the target forte tag attribute information is used for describing perception sensitivity degrees to definitions of an auditory part and a visual part in the target video; and initiate a target video resource request according to the target video level to perform at least one of downloading and playing on the target video with the target video level.

Computer program codes for performing the operations of the present disclosure may be written in one or more programming languages or a combination thereof. The above programming languages include an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, two blocks shown in succession may be actually performed basically in parallel, and sometimes the two blocks may be performed in a reverse sequence. This is determined by a related function. It is also to be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and computer instructions.

The units described in the embodiments of the present disclosure can be implemented through software or hardware. The name of the unit does not constitute a limitation on the unit itself. For example, the first obtaining unit can also be described as "a unit that obtains at least two Internet protocol addresses".

The functions described herein above may be performed, at least in part, by one or a plurality of hardware logic components. For example, nonrestrictively, demonstration types of hardware logic components that can be used include: a Field Programmable Gate Array (FPGA), an Application Specific Integrated Circuit (ASIC), an Application Specific Standard Part (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination of the above content. Examples of the machine-readable storage medium may include an electrical connection based on one or more wires, a portable computer disk, a hard disk, a RAM, a ROM, an EPROM or flash memory, an optical fiber, a CD-ROM, an optical storage device, a magnetic storage device, or any suitable combinations of the above contents.

According to one or more embodiments of the present disclosure, Example 1 provides a voice control method. The method includes:

- determining target forte attribute tag information that matches a target video, where the target forte attribute tag information is used for describing perception sensitivity degrees to definitions of an auditory part and a visual part in the target video;
- determining, according to the target forte attribute tag information, a target video level to be used in the target video; and
- performing, according to the target video level, downloading and/or playing control on the target video.

In Example 2, according to the method of Example 1, determining the target forte attribute tag information that matches the target video includes:

- determining a target auditory applicability of the target video according to target audio track information of the target video, where the target auditory applicability describes a degree of applicability for perceiving, using an auditory mode, key content expressed by the target video; and
- determining, according to the target auditory applicability and target content classification, the target forte attribute tag information that matches the target video, where the target content classification describes a performing form used for presenting content expressed by the target video.

In Example 3, according to the method of Example 2, determining the target auditory applicability of the target video according to the target audio track information of the target video includes:

- determining, according to the target audio track information, whether the target video satisfies a preset determining standard condition, where the preset determining standard condition includes a first standard condition, a second standard condition, and/or a third standard condition, the first standard condition includes the visual part in the video remaining stationary, the second standard condition includes a ratio of the key content in the video to the visual part in the video being less than a preset value and the key content in the video being able to be obtained by parsing without perceiving the visual part in the video, and the third standard condition includes the auditory part in the video containing an explanation of the visual part in the video; and determining the target auditory applicability of the target video according to a result of satisfaction of the target video on the preset determining standard condition, where the target auditory applicability is in positive correlation with a tendency to use the auditory mode to perceive the target video.

In Example 4, according to the method of Example 1, determining, according to the target forte attribute tag information, the target video level to be used in the target video, includes:

determining target reference information used by the target video, where the target reference information includes a target network state and/or target resolution information, and the resolution information includes a screen resolution or a playing window resolution; and determining, from preset video levels of the target video according to the target forte attribute tag information and the target reference information, the target video level to be used in the target video, where the higher a perception sensitivity degree, described by the target forte attribute tag information, to a definition of the auditory part relative to the visual part, the lower the definition of the target video level used by the target video.

In Example 5, according to the method of Example 4, performing downloading control and/or playing control on the target video according to the target video level includes:

sending the target video level to a target client to cause the target client to initiate a target video resource request according to the target video level; and in response to the target video resource request, sending the target video with the target video level to the target client for downloading an/or playing.

In Example 6, according to the method of Example 1, determining, according to the target forte attribute tag information, a target video level to be used in the target video includes:

in response to a video level determining request of a target client, sending the target forte attribute tag information that matches the target video and preset video levels of the target video to the target client, to cause the target client to determine the target video level to be used in the target video from the preset video levels of the target video according to the target forte attribute tag information, a target network state, and a target screen resolution, where the target network state and the target screen resolution use a network state and a screen resolution in response to the target client playing the target video.

In Example 7, according to the method of Example 6, performing downloading control and/or playing control on the target video according to the target video level includes:

in response to a target video resource request initiated by the target client, sending the target video with the target video level to the target client for downloading and/or playing; where the target video resource request is initiated by the target client based on the target video level to be used in the target video determined by the target client.

In Example 8, according to the method of any of Examples 4 to 7, determining the target video level to be used in the target video from the preset video levels of the target video according to the target forte attribute tag information, the target network state, and the target screen resolution includes:

determining, from the preset video levels of the target video according to the target network state, a first video level upper limit currently applicable to the target video;

determining, from preset video levels corresponding to the first video level upper limit according to the target screen resolution, a second video level upper limit currently applicable to the target video; and determining, from preset video levels corresponding to the second video level upper limit according to the target forte attribute tag information, the target video level currently to be used in the target video.

According to one or more embodiments of the present disclosure, Example 9 provides a voice control method. The video control method includes:

loading a target video level to be used in a target video, where the target video level is determined based on target forte tag attribute information, the target forte tag attribute information matches the target video, and the target forte tag attribute information is used for describing perception sensitivity degrees to definitions of an auditory part and a visual part in the target video; and initiating a target video resource request according to the target video level to download and/or play the target video with the target video level.

According to one or more embodiments of the present disclosure, Example 10 provides a video control apparatus. The video control apparatus includes:

a target forte attribute tag information determining module, configured to determine target forte attribute tag information that matches a target video, where the target forte attribute tag information is used for describing perception sensitivity degrees to definitions of an auditory part and a visual part in the target video;

a target video level determining module, configured to determine, according to the target forte attribute tag information, a target video level to be used in the target video; and a target video control module, configured to perform downloading and/or playing control on the target video according to the target video level.

According to one or more embodiments of the present disclosure, Example 11 provides a video control apparatus. The video control apparatus includes:

a target video level loading module, configured to load a target video level to be used in a target video, wherein the target video level is determined based on target forte tag attribute information; the target forte tag attribute information matches the target video; the target forte tag attribute information is used for describing perception sensitivity degrees to definitions of an auditory part and a visual part in the target video; and a target video resource request initiation module, configured to initiate a target video resource request according to the target video level to download and/or play the target video with the target video level.

According to one or more embodiments of the present disclosure, Example 12 provides a video control electronic device. The electronic device includes:

one or more processors; and a storage apparatus, configured to store one or more programs.

The one or more programs, when executed by the one or more processors, cause the one or more processors to implement the video control method according to any of Examples 1 to 8 or Example 9.

According to one or more embodiments of the present disclosure, Example 13 further provides a storage medium including computer-executable instructions. The computer-executable instructions, when executed by a computer processor, are used for performing the video control method according to any of Examples 1 to 8 or Example 9.

According to one or more embodiments of the present disclosure, Example 14 further provides a computer program product, including a computer program carried on a non-transitory computer-readable medium. The computer program includes program codes used for performing the video control method according to any of Examples 1 to 8 or Example 9.

In addition, although multiple operations are depicted in a specific order, this should not be understood as requiring these operations to be executed in the specific order shown or in a sequential order. In certain environments, multitasking and parallel processing may be advantageous. Similarly, although a plurality of implementation details are included in the above discussion, these should not be interpreted as limiting the scope of the present disclosure. Some features described in the context of individual embodiments can also be combined and implemented in a single embodiment. On the contrary, various features that are described in the context of the single embodiment may also be implemented in a plurality of embodiments separately or in any suitable sub-combinations.

We claim:

1. A video control method, comprising:

determining target forte attribute tag information that matches a target video, wherein the target forte attribute tag information is used for describing perception sensitivity degrees to definitions of an auditory part and a visual part in the target video;

determining, according to the target forte attribute tag information, a target video level to be used in the target video; and performing, according to the target video level, at least one of downloading control or playing control on the target video.

2. The method according to claim 1, wherein determining the target forte attribute tag information that matches the target video comprises:

determining a target auditory applicability of the target video according to target audio track information of the target video, wherein the target auditory applicability describes a degree of applicability for perceiving, using an auditory mode, key content expressed by the target video; and determining, according to the target auditory applicability and target content classification, the target forte attribute tag information that matches the target video, wherein the target content classification describes a performing form used for presenting content expressed by the target video.

3. The method according to claim 2, wherein determining the target auditory applicability of the target video according to the target audio track information of the target video comprises:

determining, according to the target audio track information, whether the target video satisfies a preset determining standard condition, wherein the preset determining standard condition comprises at least one of a first standard condition, a second standard condition, or a third standard condition, the first standard condition comprises the visual part in the video remaining stationary, the second standard condition comprises a ratio of the key content in the video to the visual part in the video being less than a preset value and the key content in the video being able to be obtained by parsing without perceiving the visual part in the video, and the third standard condition comprises the auditory part in the video containing an explanation of the visual part in the video; and determining the target auditory applicability of the target video according to a result of satisfaction of the target video on the preset determining standard condition, wherein the target auditory applicability is in positive correlation with a tendency to use the auditory mode to perceive the target video.

4. The method according to claim 1, wherein determining, according to the target forte attribute tag information, the target video level to be used in the target video, comprises:

determining target reference information used by the target video, wherein the target reference information comprises at least one of a target network state or target resolution information, and the resolution information comprises a screen resolution or a playing window resolution; and determining, from preset video levels of the target video according to the target forte attribute tag information and the target reference information, the target video level to be used in the target video, wherein the higher a perception sensitivity degree, described by the target forte attribute tag information, to a definition of the auditory part relative to the visual part, the lower the definition of the target video level used by the target video.

5. The method according to claim 4, wherein performing at least one of downloading control or playing control on the target video according to the target video level comprises:

sending the target video level to a target client to cause the target client to initiate a target video resource request according to the target video level; and in response to the target video resource request, sending the target video with the target video level to the target client for at least one of downloading control or playing.

6. The method according to claim 4, wherein determining the target video level to be used in the target video from the preset video levels of the target video according to the target forte attribute tag information, the target network state, and the target screen resolution comprises:

determining, from the preset video levels of the target video according to the target network state, a first video level upper limit currently applicable to the target video;

determining, from preset video levels corresponding to the first video level upper limit according to the target screen resolution, a second video level upper limit currently applicable to the target video; and determining, from preset video levels corresponding to the second video level upper limit according to the target forte attribute tag information, the target video level currently to be used in the target video.

7. The method according to claim 1, wherein determining, according to the target forte attribute tag information, the target video level to be used in the target video, comprises:

in response to a video level determining request of a target client, sending the target forte attribute tag information that matches the target video and preset video levels of the target video to the target client, to cause the target client to determine the target video level to be used in the target video from the preset video levels of the target video according to the target forte attribute tag information, a target network state, and a target screen resolution, wherein the target network state and the target screen resolution use a network state and a screen resolution when the target client playing the target video.

8. The method according to claim 7, wherein performing at least one of downloading control or playing control on the target video according to the target video level comprises:

in response to a target video resource request initiated by the target client, sending the target video with the target video level to the target client for at least one of downloading or playing; wherein the target video resource request is initiated by the target client based on the target video level to be used in the target video determined by the target client.

9. The method according to claim 7, wherein the at least one program, when causing the at least one processor to determine the target video level to be used in the target video from the preset video levels of the target video according to the target forte attribute tag information, the target network state, and the target screen resolution comprises:

determining, from the preset video levels of the target video according to the target network state, a first video level upper limit currently applicable to the target video;

determining, from preset video levels corresponding to the first video level upper limit according to the target screen resolution, a second video level upper limit currently applicable to the target video; and determining, from preset video levels corresponding to the second video level upper limit according to the target forte attribute tag information, the target video level currently to be used in the target video.

10. A video control method, comprising:

loading a target video level to be used in a target video, wherein the target video level is determined based on target forte tag attribute information, the target forte tag attribute information matches the target video, and the target forte tag attribute information is used for describing perception sensitivity degrees to definitions of an auditory part and a visual part in the target video; and initiating a target video resource request according to the target video level to perform at least one of downloading or playing on the target video with the target video level.

11. An electronic device, comprising:

at least one processor; and a storage apparatus, configured to storage at least one program, wherein the at least one program, when executed by the at least one processor, causes the at least one processor to determine target forte attribute tag information that matches a target video, wherein the target forte attribute tag information is used for describing perception sensitivity degrees to definitions of an auditory part and a visual part in the target video;

determine, according to the target forte attribute tag information, a target video level to be used in the target video; and perform, according to the target video level, at least one of downloading control or playing control on the target video.

12. The electronic device according to claim 11, wherein the at least one program, when causing the at least one processor to determine the target forte attribute tag information that matches the target video, causes the at least one processor to:

determine a target auditory applicability of the target video according to target audio track information of the target video, wherein the target auditory applicability describes a degree of applicability for perceiving, using an auditory mode, key content expressed by the target video; and determine, according to the target auditory applicability and target content classification, the target forte attribute tag information that matches the target video, wherein the target content classification describes a performing form used for presenting content expressed by the target video.

13. The electronic device according to claim 12, wherein the at least one program, when causing the at least one processor to determine the target auditory applicability of the target video according to the target audio track information of the target video, causes the at least one processor to:

determine, according to the target audio track information, whether the target video satisfies a preset determining standard condition, wherein the preset determining standard condition comprises at least one of a first standard condition, a second standard condition, or a third standard condition, the first standard condition comprises the visual part in the video remaining stationary, the second standard condition comprises a ratio of the key content in the video to the visual part in the video being less than a preset value and the key content in the video being able to be obtained by parsing without perceiving the visual part in the video, and the third standard condition comprises the auditory part in the video containing an explanation of the visual part in the video; and determine the target auditory applicability of the target video according to a result of satisfaction of the target video on the preset determining standard condition, wherein the target auditory applicability is in positive correlation with a tendency to use the auditory mode to perceive the target video.

14. The electronic device according to claim 11, wherein the at least one program, when causing the at least one processor to determine, according to the target forte attribute tag information, the target video level to be used in the target video, causes the at least one processor to:

determine target reference information used by the target video, wherein the target reference information comprises at least one of a target network state or target resolution information, and the resolution information comprises a screen resolution or a playing window resolution; and determine, from preset video levels of the target video according to the target forte attribute tag information and the target reference information, the target video level to be used in the target video, wherein the higher a perception sensitivity degree, described by the target forte attribute tag information, to a definition of the auditory part relative to the visual part, the lower the definition of the target video level used by the target video.

15. The electronic device according to claim 14, wherein the at least one program, when causing the at least one processor to perform at least one of downloading control or playing control on the target video according to the target video level, causes the at least one processor to:

send the target video level to a target client to cause the target client to initiate a target video resource request according to the target video level; and in response to the target video resource request, send the target video with the target video level to the target client for at least one of downloading control or playing.

16. The electronic device according to claim 15, wherein the at least one program, when causing the at least one processor to determining the target video level to be used in the target video from the preset video levels of the target video according to the target forte attribute tag information, the target network state, and the target screen resolution, causes the at least one processor to:

determine, from the preset video levels of the target video according to the target network state, a first video level upper limit currently applicable to the target video;

determine, from preset video levels corresponding to the first video level upper limit according to the target screen resolution, a second video level upper limit currently applicable to the target video; and determine, from preset video levels corresponding to the second video level upper limit according to the target forte attribute tag information, the target video level currently to be used in the target video.

17. The electronic device according to claim 14, wherein the at least one program, when causing the at least one processor to determine the target video level to be used in the target video from the preset video levels of the target video according to the target forte attribute tag information, the target network state, and the target screen resolution, causes the at least one processor to:

determine, from the preset video levels of the target video according to the target network state, a first video level upper limit currently applicable to the target video;

determine, from preset video levels corresponding to the first video level upper limit according to the target screen resolution, a second video level upper limit currently applicable to the target video; and determine, from preset video levels corresponding to the second video level upper limit according to the target forte attribute tag information, the target video level currently to be used in the target video.

18. The electronic device according to claim 11, wherein the at least one program, when causing the at least one processor to determine, according to the target forte attribute tag information, the target video level to be used in the target video, causes the at least one processor to:

in response to a video level determining request of a target client, send the target forte attribute tag information that matches the target video and preset video levels of the target video to the target client, to cause the target client to determine the target video level to be used in the target video from the preset video levels of the target video according to the target forte attribute tag information, a target network state, and a target screen resolution, wherein the target network state and the target screen resolution use a network state and a screen resolution when the target client playing the target video.

19. The electronic device according to claim 18, wherein the at least one program, when causing the at least one processor to perform at least one of downloading control or playing control on the target video according to the target video level, causes the at least one processor to:

in response to a target video resource request initiated by the target client, send the target video with the target video level to the target client for at least one of downloading or playing; wherein the target video resource request is initiated by the target client based on the target video level to be used in the target video determined by the target client.

20. The electronic device according to claim 18, wherein the at least one program, when causing the at least one processor to determining the target video level to be used in the target video from the preset video levels of the target video according to the target forte attribute tag information, the target network state, and the target screen resolution, causes the at least one processor to:

determine, from the preset video levels of the target video according to the target network state, a first video level upper limit currently applicable to the target video;

determine, from preset video levels corresponding to the first video level upper limit according to the target screen resolution, a second video level upper limit currently applicable to the target video; and determine, from preset video levels corresponding to the second video level upper limit according to the target forte attribute tag information, the target video level currently to be used in the target video.

* * * * *